May 25, 1948.  E. A. RONEY  2,442,096

METAL FILTER FOR COFFEE DISPENSERS

Filed Feb. 11, 1946

INVENTOR.
EDWARD A. RONEY
BY Edward C Healy
ATTORNEY

Patented May 25, 1948

2,442,096

UNITED STATES PATENT OFFICE 2,442,096

METAL FILTER FOR COFFEE DISPENSERS

Edward A. Roney, Oakland, Calif.

Application February 11, 1946, Serial No. 646,855

1 Claim. (Cl. 210—162)

This invention relates to new and useful improvements in metal filters for coffee dispensers and has particular reference to that type of coffee making dispenser comprising a lower receptacle and an upper receptacle and provided with an elongated rod having an enlarged round oval shaped filtering member centrally located thereon, which rests on a seat that is positioned in between the two receptacles for filtering coffee passing from the upper receptacle into the lower receptacle.

The said type of filter rod is constructed of glass and the oval shaped protuberance thereon is roughened to form the filtering element. It will be obvious that the glass rod easily becomes broken and also that the filtering element will be very inefficient due to the fact that the said rod and protuberance thereon with its rough surface, being constructed of glass, must be moulded and cannot be machined to form the proper filter.

It is therefore an object of the present invention to construct the said rod and filtering element thereon of a suitable metal and to finely knurl the metal surface of the filtering element by machining the exact dimensions required to form the most efficient filter.

Another object of the present invention is the provision of a specially constructed guide or spring member to retain the rod in its proper operative position.

Other objects and advantages will be apparent during the course of the following description.

Figure 1:
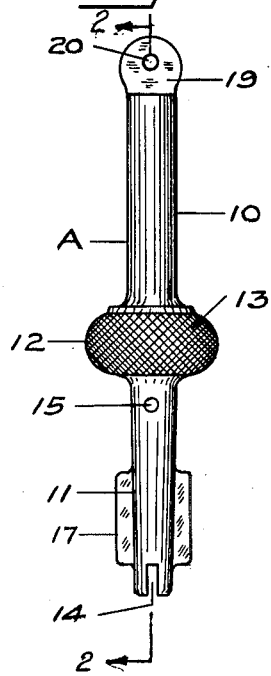
Figure 2:
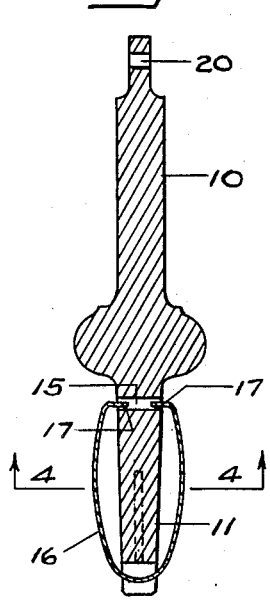
Figure 3:
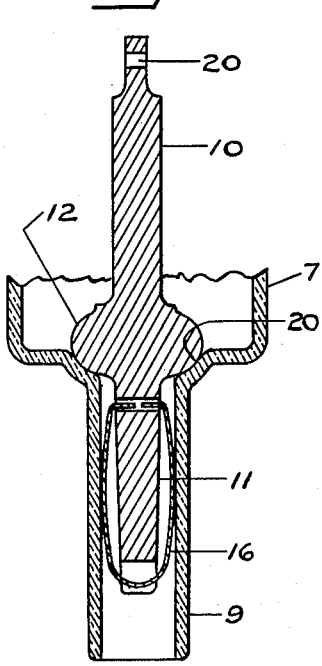

In the accompanying drawing forming a part of the specification and wherein for the purpose of illustration like numerals designate like parts throughout the same, Fig. 1 is a vertical side elevational view of the rod and knurled filtering element formed thereon, Fig. 2 is a central vertical sectional view of the rod taken on line 2—2 of Fig. 1 and also showing the specially constructed spring member that is provided for retaining the rod in its proper position, Fig. 3 is a central vertical sectional view of the device similar to Fig. 2, and also showing a sectional fragmentary portion of the upper receptacle of a coffee maker and illustrating how the device is retained in its operative position.

Figure 5:
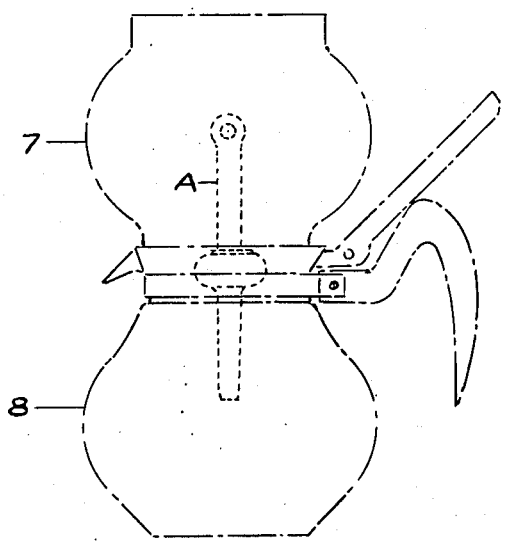
Figure 4:
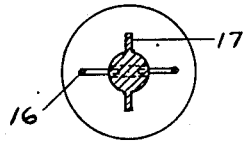

Fig. 4 is a transverse sectional view taken on line 4—4 of Fig. 2, looking in direction of the arrows, and Fig. 5 is a vertical side elevational view in dot and dash outline of a conventional type of coffee maker in which the invention is employed and also showing the device in dotted lines therein.

Referring in detail to the drawing and to the different parts thereof, the numerals 7 and 8, respectively, designate the upper and lower receptacles of the type of coffee maker in which the invention is used and the numeral 9 designates a tubular portion on the bottom of the upper receptacle and which extends downwardly into the lower receptacle. The new and improved filtering device comprises a metal rod designated as a whole by the reference character A and having an upper portion 10, a lower portion 11 and a substantially centrally positioned protuberance 12 hereinafter termed the filtering element which is finely knurled as illustrated by the angular cross lines 13 in Fig. 1. The lower portion of the rod is slotted as at 14 and apertured as at 15 to accommodate a specially curved wire spring 16, the lower curved extremity of which extends through the slot 14 and the upper inwardly bent extremities 17 project into the aperture 15 as shown in Fig. 2, whereby the curved wire spring 16 is contractable and the lower portion of said rod will be slidably and resiliently retained into the depending tubular portion 9 of the upper receptacle 7 as illustrated in Fig. 3. Said lower portion 11 of the rod is preferably provided with a plurality of thin vertical fins 18 to properly guide said rod within the tubular member 9. The upper extremity of the rod is preferably flat in form as at 19 to provide a suitable finger hold and is apertured as at 20 for enabling the rod to be hung up when not in use.

From the foregoing description taken in consideration with the accompanying drawing it will be obvious that when water is placed in the lower receptacle 8 and heated beyond the boiling point the pressure generated will lift the filter rod and the boiling water will rise into the upper coffee receptacle 7 after which the vacuum produced in the lower receptacle by the boiling water rising into the upper receptacle will cause the filter to close on the seat 20 of said upper receptacle, whereby the said water mixed with coffee will be filtered as it passes through the finely knurled portions 13 of the filter 12 and emerges back into the lower receptacle 7 and the said rod will be perfectly guided and controlled during the said operation.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In combination with a coffee maker having a lower receptacle and an upper receptacle with a depending tube extending therefrom, a coffee filtering device comprising an elongated round metal rod, a circular knurled protuberance intermediately positioned thereon forming a filtering surface, an aperture provided horizontally through the rod beneath the said protuberance, a slot provided through the lower extremity of the rod in parallelism with the said aperture, a vertically curved spring wire formed with oppositely disposed inwardly bent upper end portions, which bent end portions removably extend in the said aperture, the lower end of the curved portion of the said spring wire extending through the said slot, whereby the said rod is resiliently retained in the depending tube of the upper coffee receptacle and a pair of oppositely disposed vertical fins on the said rod for centering and slidably supporting the rod in the said depending tube.

EDWARD A. RONEY.

REFERENCES CITED

The following references are of record in the file of this patent:

UNITED STATES PATENTS

| Number | Name | Date |
|---|---|---|
| 2,058,136 | Cory | Oct. 20, 1936 |
| 2,190,965 | Wood | Feb. 20, 1940 |
| 2,291,427 | Wolcott | July 28, 1942 |
| 2,366,951 | Aycock | Jan. 9, 1945 |
| 2,376,410 | Wolper | May 22, 1945 |
| 2,392,656 | Foster | Jan. 8, 1946 |